(12) United States Patent
Kimura et al.

(10) Patent No.: US 8,305,633 B2
(45) Date of Patent: Nov. 6, 2012

(54) REGISTERING APPARATUS, AUTHENTICATION SYSTEM, REGISTERING PROGRAM STORAGE MEDIUM AND REGISTERING METHOD

(75) Inventors: Tetsuya Kimura, Ashigarakami-gun (JP); Kensuke Ito, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 409 days.

(21) Appl. No.: 12/626,174

(22) Filed: Nov. 25, 2009

(65) Prior Publication Data
US 2010/0328687 A1 Dec. 30, 2010

(30) Foreign Application Priority Data

Jun. 26, 2009 (JP) ................................. 2009-152824

(51) Int. Cl.
*G06K 9/64* (2006.01)
(52) U.S. Cl. .................... 358/1.6; 358/1.15; 358/505
(58) Field of Classification Search .................. 358/505, 358/474; 382/100
See application file for complete search history.

(56) References Cited

U.S. PATENT DOCUMENTS

| | | | | |
|---|---|---|---|---|
| 7,305,104 B2* | 12/2007 | Carr et al. | | 382/100 |
| 7,308,110 B2* | 12/2007 | Rhoads | | 382/100 |
| 7,624,928 B2* | 12/2009 | Kimura et al. | | 235/494 |
| 7,707,422 B2* | 4/2010 | Shin et al. | | 713/176 |
| 8,050,450 B2* | 11/2011 | Miller et al. | | 382/100 |
| 8,078,875 B2* | 12/2011 | Cowburn et al. | | 713/176 |
| 2003/0009670 A1* | 1/2003 | Rhoads | | 713/176 |
| 2004/0071311 A1* | 4/2004 | Choi et al. | | 382/100 |
| 2004/0079800 A1* | 4/2004 | Sugino et al. | | 235/436 |
| 2005/0147282 A1* | 7/2005 | Fujii | | 382/124 |
| 2006/0180515 A1* | 8/2006 | Kimura et al. | | 209/547 |
| 2007/0115499 A1* | 5/2007 | Kimura et al. | | 358/1.15 |
| 2007/0122022 A1* | 5/2007 | Shimizu et al. | | 382/135 |
| 2008/0068674 A1* | 3/2008 | McIntyre | | 358/474 |

FOREIGN PATENT DOCUMENTS

JP 2008-158587 A 7/2008

* cited by examiner

*Primary Examiner* — King Poon
*Assistant Examiner* — Ted Barnes
(74) *Attorney, Agent, or Firm* — Sughrue Mion, PLLC

(57) ABSTRACT

A registering apparatus includes: a first image data acquiring unit that acquires first image data from a first region on a recording medium; a second image data acquiring unit that acquires second image data from a second region that includes the first region; a third image data acquiring unit that acquires third image data from a third region that does not include the first region and differs from the second region when a correlation value between the second image data and the first image data is equal to or greater than a predetermined first threshold value; and a registering unit that registers the first image data as registration data that are image data to be used in authentication of the recording medium when a correlation value between the third image data and the first image data is equal to or less than a second threshold value.

13 Claims, 14 Drawing Sheets

FIG.7

| SHEET ID | IDENTIFICATION DATA 1 | IDENTIFICATION DATA 2 | IDENTIFICATION DATA 3 | ... | IDENTIFICATION DATA k |
|---|---|---|---|---|---|
| 00000001 | 1-00000001.dat | UNSUITABLE | 3-00000001.dat | ... | k-00000001.dat |
| 00000002 | 1-00000002.dat | 2-00000002.dat | UNSUITABLE | ... | k-00000002.dat |
| ... | ... | ... | ... | ... | ... |
| FFFFFFFF | UNSUITABLE | 2-FFFFFFFF.dat | 3-FFFFFFFF.dat | ... | k-FFFFFFFF.dat |

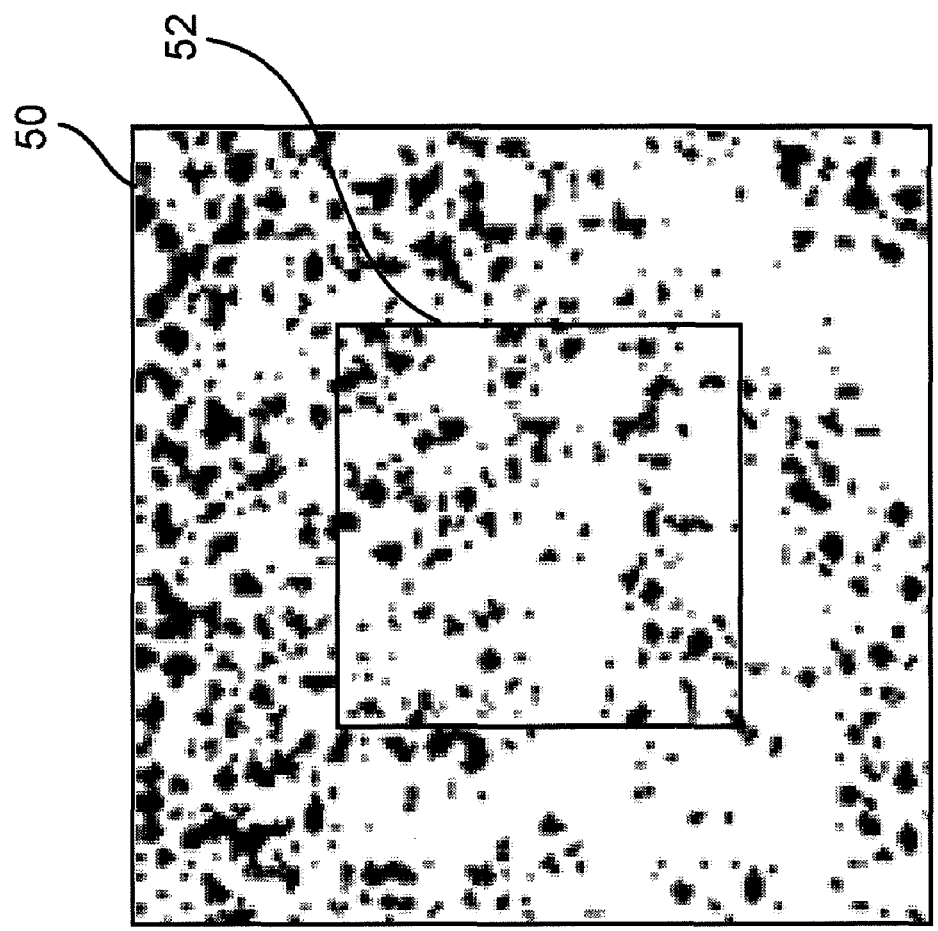

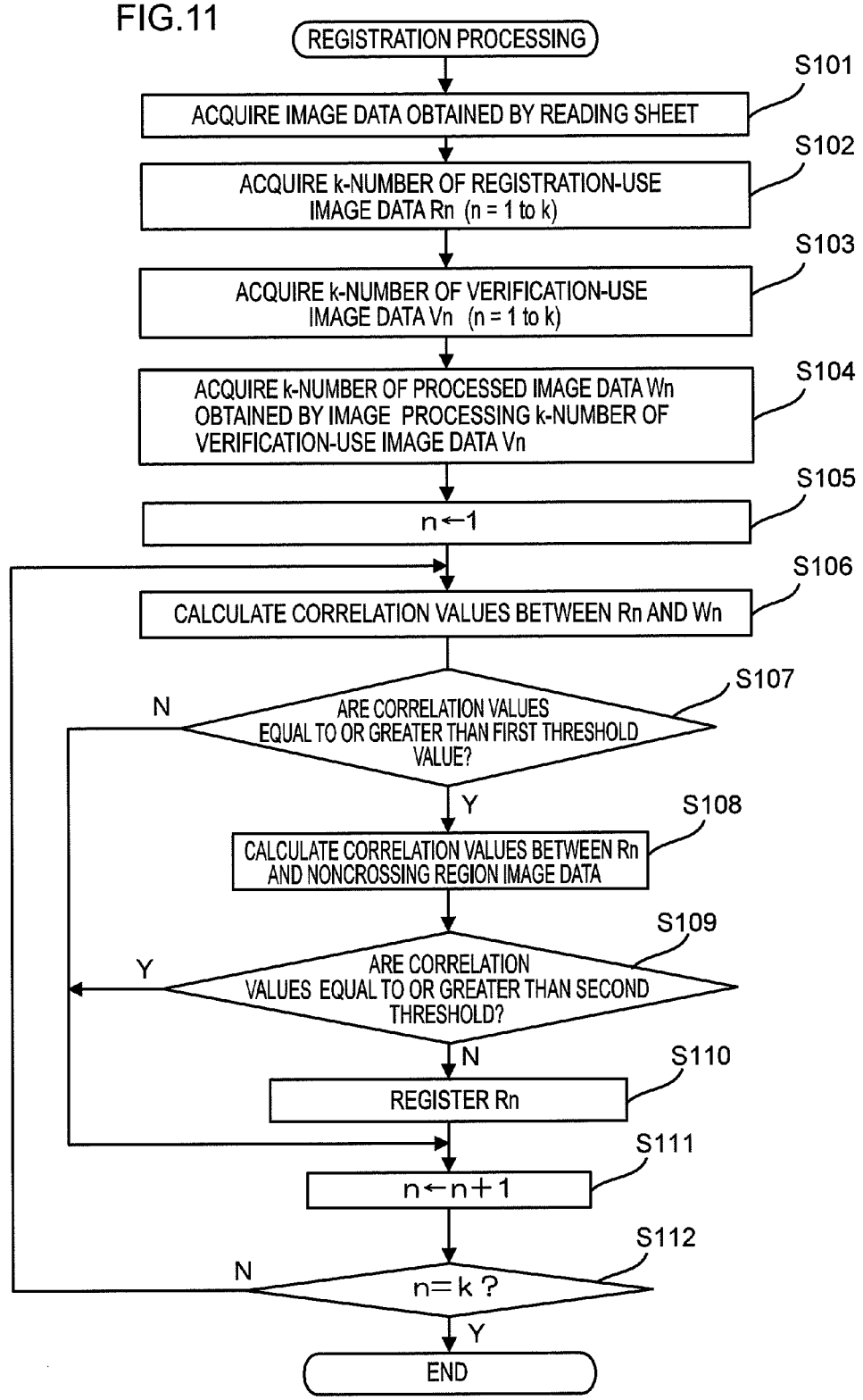

REGISTERING APPARATUS, AUTHENTICATION SYSTEM, REGISTERING PROGRAM STORAGE MEDIUM AND REGISTERING METHOD

CROSS-REFERENCE TO RELATED APPLICATION

This application is based on and claims priority under 35 USC 119 from Japanese Patent Application No. 2009-152824 filed on Jun. 26, 2009.

BACKGROUND

1. Technical Field

The present invention relates to a registering apparatus, an authentication system, a registering program storage medium and a registering method.

2. Related Art

There is a conventional technology which causes a unique characteristic region of recording paper to be read, cuts out unique characteristic information of the recording paper and stores an ID of the document to be printed on the recording paper in association with the characteristic information in a database.

SUMMARY

One aspect of the invention is a registering apparatus including: a first image data acquiring unit that acquires first image data from a predetermined first region on a recording medium; a second image data acquiring unit that acquires second image data from a second region that includes the first region; a third image data acquiring unit that acquires third image data from a third region that does not include the first region on the recording medium and differs from the second region when a correlation value between the second image data and the first image data is equal to or greater than a predetermined first threshold value; and a registering unit that registers the first image data as registration data that are image data to be used in authentication of the recording medium when a correlation value between the third image data and the first image data is equal to or less than a second threshold value.

BRIEF DESCRIPTION OF THE DRAWINGS

An exemplary embodiment of the present invention will be described in detail based on the following figures, wherein:

FIG. 7 is a diagram showing a registration database;

FIG. 8 is a diagram showing an image example represented by image data that have been obtained by reading a sheet;

FIG. 11 is a flowchart showing a flow of registration processing;

DETAILED DESCRIPTION

In the description below, "recording medium" will sometimes be called "sheet".

Figure 1:
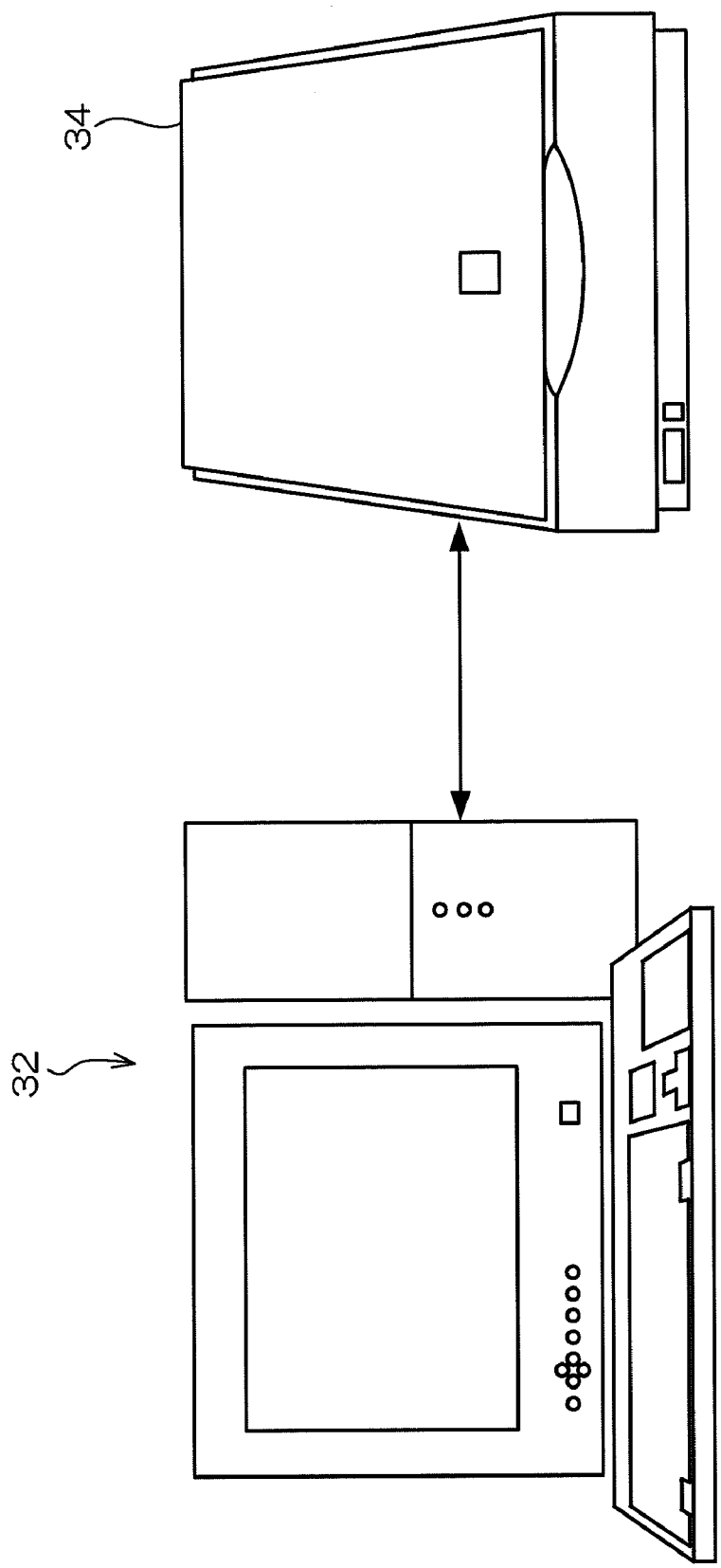
FIG. 1 is a diagram showing a registering apparatus pertaining to the exemplary embodiment.

First, a registering apparatus pertaining to the present exemplary embodiment will be described. In FIG. 1, there are shown a personal computer (PC) 32 and a scanner 34 that are capable of functioning as the registering apparatus.

Figure 2:
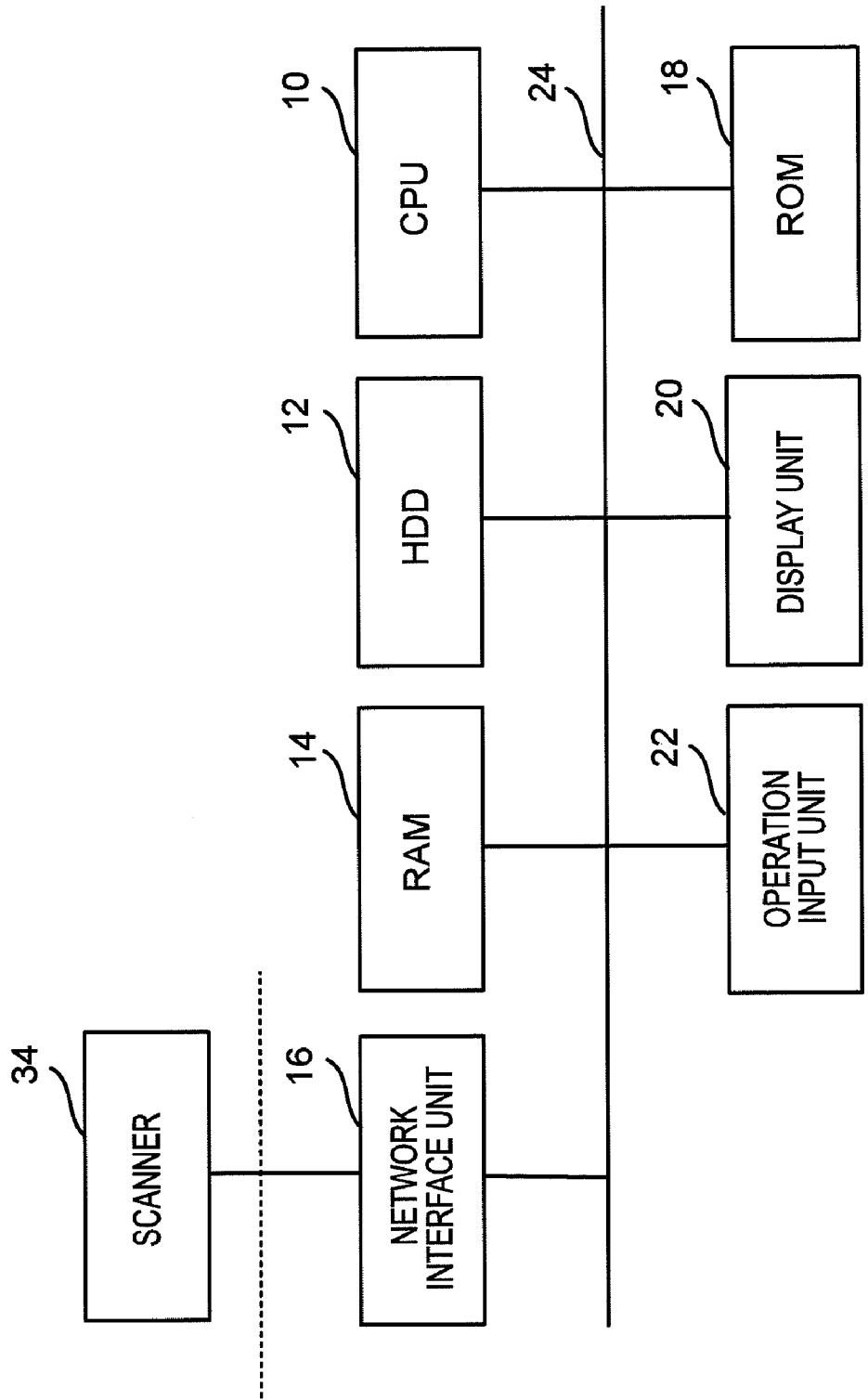
FIG. 2 is a diagram showing the configuration of a PC.

The PC 32 includes, as shown in FIG. 2, a CPU 10, a HDD 12, a RAM 14, a network interface unit 16, a ROM 18, a display unit 20, an operation input unit 22 and a bus 24.

The CPU 10 controls the operation of the entire PC 32. Flowcharts showing processing of the PC 32 discussed later are executed by the CPU 10. The HDD 12 is a nonvolatile storage device. In the HDD 12, there are stored an OS and various types of application software programs and a registration processing program for performing registration processing discussed later. Moreover, in the HDD 12, there is stored a registration database (hereinafter called "the registration DB") discussed later. The RAM 14 is a volatile storage device in which the OS, programs and data are developed.

The network interface unit 16 is for connecting to the scanner 34 and is configured by a USB device and a USB device driver. The ROM 18 is a nonvolatile storage device in which a boot program that operates at the time the PC 32 starts up is stored. The display unit 20 displays information to an operator. The operation input unit 22 is used when the operator inputs operation and information to the PC 32. The bus 24 is used when information exchange is performed.

It will be noted that the registering program does not invariably have to be a program that is recorded in the HDD 12. Examples of recording media other than the HDD 12 may specifically include portable recording media in which the program is recorded. In this case, a reading device for reading the portable recording media is disposed in the registering apparatus, and the portable recording media cause a changed state of magnetic, optical or electrical energy with respect to the reading device so that it can relay the descriptive content of the program to the reading device in the format of signals corresponding to the changed state of energy.

Examples of portable recording media may include a magneto-optical disk, an optical disk (including a CD, a DVD, etc.), a magnetic disk, or a memory (including an IC card, a memory card, etc.).

The scanner 34 shown in FIG. 1 is a flatbed scanner and has the function of reading, in a predetermined resolution (e.g., 400 dpi) and a predetermined grayscale (e.g., 8-bit grayscale), documents that have been placed on a document platen (not shown). The scanner 34 is connected to the network interface unit 16 of the PC 32. The reading of documents by the scanner 34 is controlled by the PC 32. Moreover, image data that have been obtained as a result of the scanner 34 reading documents are inputted to the PC 32. The scanner 34 that is used in the present exemplary embodiment is not invariably limited to a flatbed scanner, and it suffices for the scanner 34 to be capable of reading the surface of a recording medium.

Further, the registering apparatus pertaining to the present exemplary embodiment is not limited to the configuration of the PC 32 and the scanner 34 discussed above. The registering apparatus may also have an integrated configuration that a recording device that is capable of reading the recording medium and is for registering a registration image discussed later has.

As another example of the scanner 34 discussed above, a scanner 80 that employs a constant velocity transport (CVT) system that conveys sheets at a constant velocity and reads image data from those sheets as they are being conveyed will be described using FIG. 3.

Figure 3:
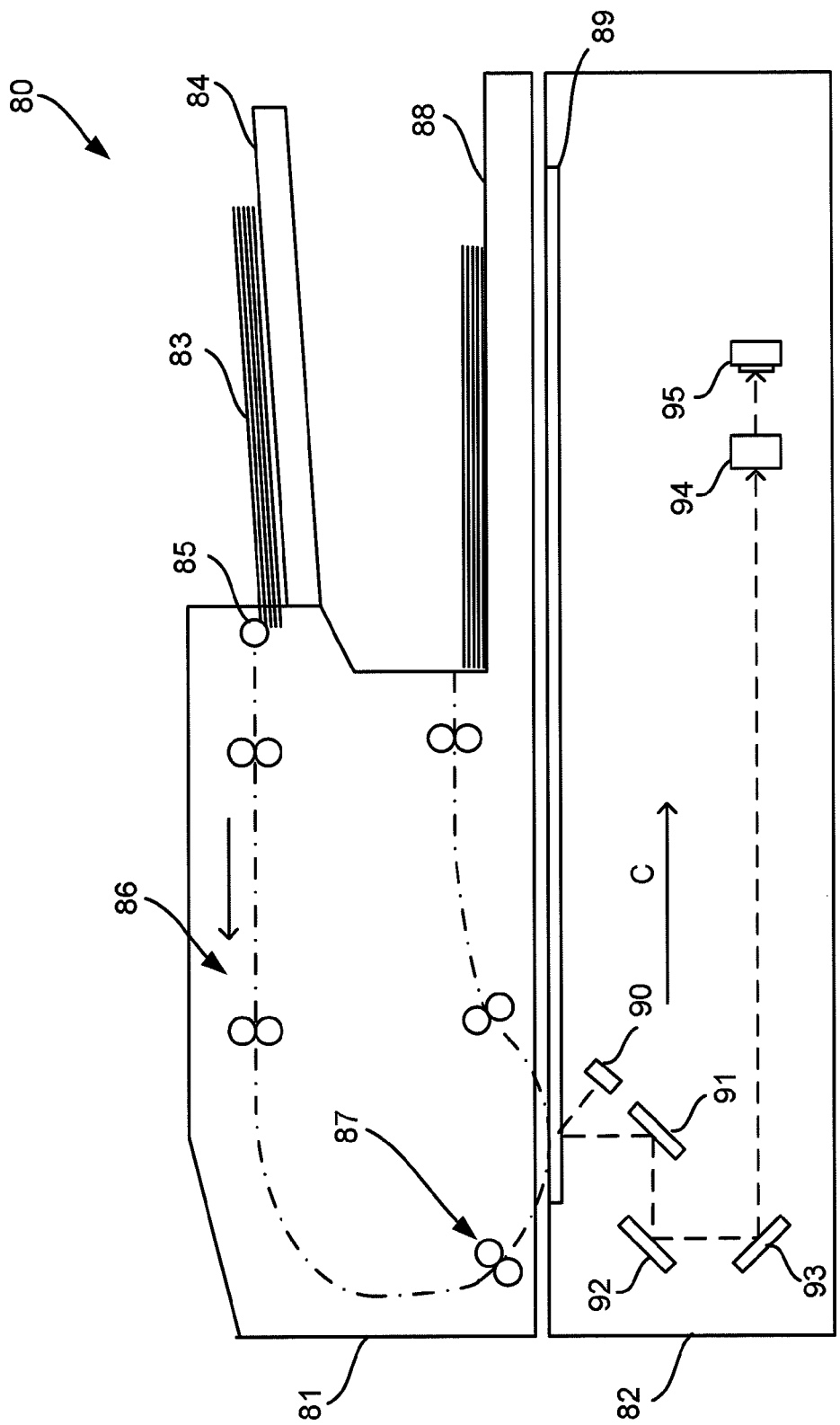
FIG. 3 is a diagram showing a scanner that employs a CVT system.

As shown in FIG. 3, the scanner 80 has a document conveying unit 81 and an image reading unit 82.

The document conveying unit 81 has a document tray 84 in which are placed sheets 83 on which images have been recorded. The sheets 83 placed in the document tray 84 are picked up one sheet at a time by a pickup roll 85 and sent to a document conveyance path 86.

The sheets 83 that have been sent to the document conveyance path 86 are conveyed by conveyance roll pairs 87 to a surface reading position where the surfaces of the sheets 83 are read by the image reading unit 82. The surfaces of the sheets 83 are read by the image reading unit 82, and thereafter the sheets 83 are discharged into a discharge tray 88.

It will be noted that the document conveying unit 81 and the image reading unit 82 discussed above are configured such that the document conveying unit 81 can be opened and closed over the image reading unit 82 about an unillustrated spindle. That is, the document conveying unit 81 and the image reading unit 82 work such that the underside of the document conveying unit 81 may be exposed to a user as in general image forming apparatus.

The image reading unit 82 has a transparent platen glass 89 on whose upper surface the sheets 83 can be placed. Additionally, the surface reading position is positioned on the upper surface of the platen glass 89.

On the underside of the platen glass 89 in the surface reading position, there are disposed a light source 90 that irradiates the surfaces of the sheets 83 with illumination light, a first reflecting mirror 91 that receives reflection light reflected by the surfaces of the sheets 83, a second reflecting mirror 92 for bending 90° the traveling direction of the reflection light received by the first reflecting mirror 91, and a third reflecting mirror 93 for further bending 90° C. the traveling direction of the reflection light received by the second reflecting mirror 92.

Further, the image reading unit 82 has a lens 94 and a photodetector 95 equipped with plural pixels. The image reading unit 82 reads the surfaces of the sheets 83 by causing the reflection light reflected by the third reflecting mirror 93 to be imaged on the photodetector 95 by the lens 94. That is, the photodetector 95 is a unit that reads, from documents that have been placed on a document platen, the surfaces of those documents.

It will be noted that, in the scanner 80 pertaining to the present exemplary embodiment, a fluorescent lamp is used as the light source 90. However, the light source is not limited to this, and other light sources, such as plural light emitting diodes (LEDs) arrayed along a direction crossing the conveyance direction of the sheets 83, may also be used.

Further, in the scanner 80 pertaining to the present exemplary embodiment, a charge-coupled device (CCD) line sensor configured by plural CCDs is used as the photodetector 95. However, the photodetector is not limited to this, and a solid-state image sensor such as a complementary metal-oxide-semiconductor (CMOS) image sensor may also be used.

It will be noted that the scanner 80 pertaining to the present exemplary embodiment is configured such that the light source 90, the first reflecting mirror 91, the second reflecting mirror 92 and the third reflecting mirror 93 are movable in the direction of arrow C in FIG. 3. When the document conveying unit 81 is opened over the image reading unit 82 and a sheet 83 is placed on the upper surface of the platen glass 89, the sheet 83 is irradiated with the illumination light from the light source 90, and the light source 90, the first reflecting mirror 91, the second reflecting mirror 92 and the third reflecting mirror 93 are moved in the direction of arrow C. Thus, the scanner 80 is configured to be capable of reading an image recorded on the sheet 83.

When the scanner 80 reads the sheets 83, sometimes image deterioration arising due to foreign matter occurs in the sheet conveyance direction of an image that the scanner 80 has read when dust and grime adhere to the platen glass 89 or when the reading surface becomes dirty due to the accumulation of dust. It is rare for the position where this image deterioration occurs to be in the same position. One example of this image deterioration is black lines. In the description below, black lines will be used and described as an example of various types of image deterioration.

Figure 4:
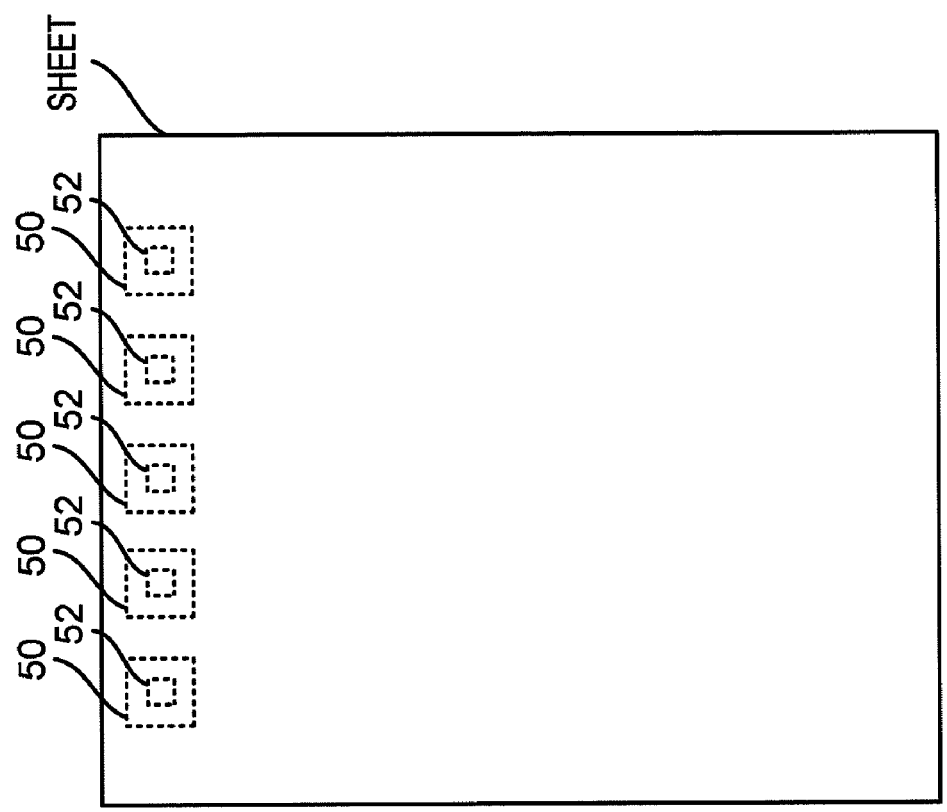
FIG. 4 is a diagram showing regions that are read into the scanner.

Thus, as shown in FIG. 4, plural regions may be read by the scanners 34 and 80. In the description below, in order to avoid complication, the scanners 34 and 80 will be simply called "the scanner 34", but it goes without saying that the description may also apply to the scanner 80.

FIG. 4 shows verification-use regions (second regions) 50 and registration-use regions (first regions) 52 on a sheet. The registration-use regions 52 are predetermined regions on the sheet. "Predetermined regions" are regions that the registering apparatus uses as registration-use regions and, for example, are predetermined using coordinates on the sheet.

Further, the verification-use regions 50 are regions that include the registration-use regions 52. In the description below, a pair of the registration-use region 52 and the verification-use region 50 that includes the registration-use region 52 will be called a reference region. This reference region may be plurally disposed (in the case of FIG. 4, there are five) as shown in FIG. 4. This is, for example, to prepare for the occurrence of the black lines discussed above. By plurally disposing the reference regions, the probability of occurrence of reference regions where black lines do not occur is increased. Moreover, as discussed above, black lines occur in the conveyance direction of the sheets, so the plural reference regions are disposed in a direction perpendicular to the conveyance direction. Thus, the registration-use regions 52 are plurally disposed in a direction perpendicular to the conveyance direction.

Further, FIG. 4 shows the registration-use regions 52 and the verification-use regions 50 as having square shapes. However, the registration-use regions 52 and the verification-use regions 50 are not limited to square shapes. Moreover, FIG. 4 shows a case where the plural reference regions are positioned in one row in a direction perpendicular to the conveyance direction, but the reference regions may also be positioned in a direction parallel to the conveyance direction or in a diagonal direction.

Further, in the description below, image data that have been acquired from the verification-use regions 50 (second image data) will be called verification-use image data, and image data that have been acquired from the registration-use regions 52 (first image data) will be called registration-use image data. Moreover, image data that have actually been registered of the registration-use image data will be called identification-use image data. The verification-use image data, the registration-use image data and the identification-use image data are image data representing a sheet.

Figure 5:
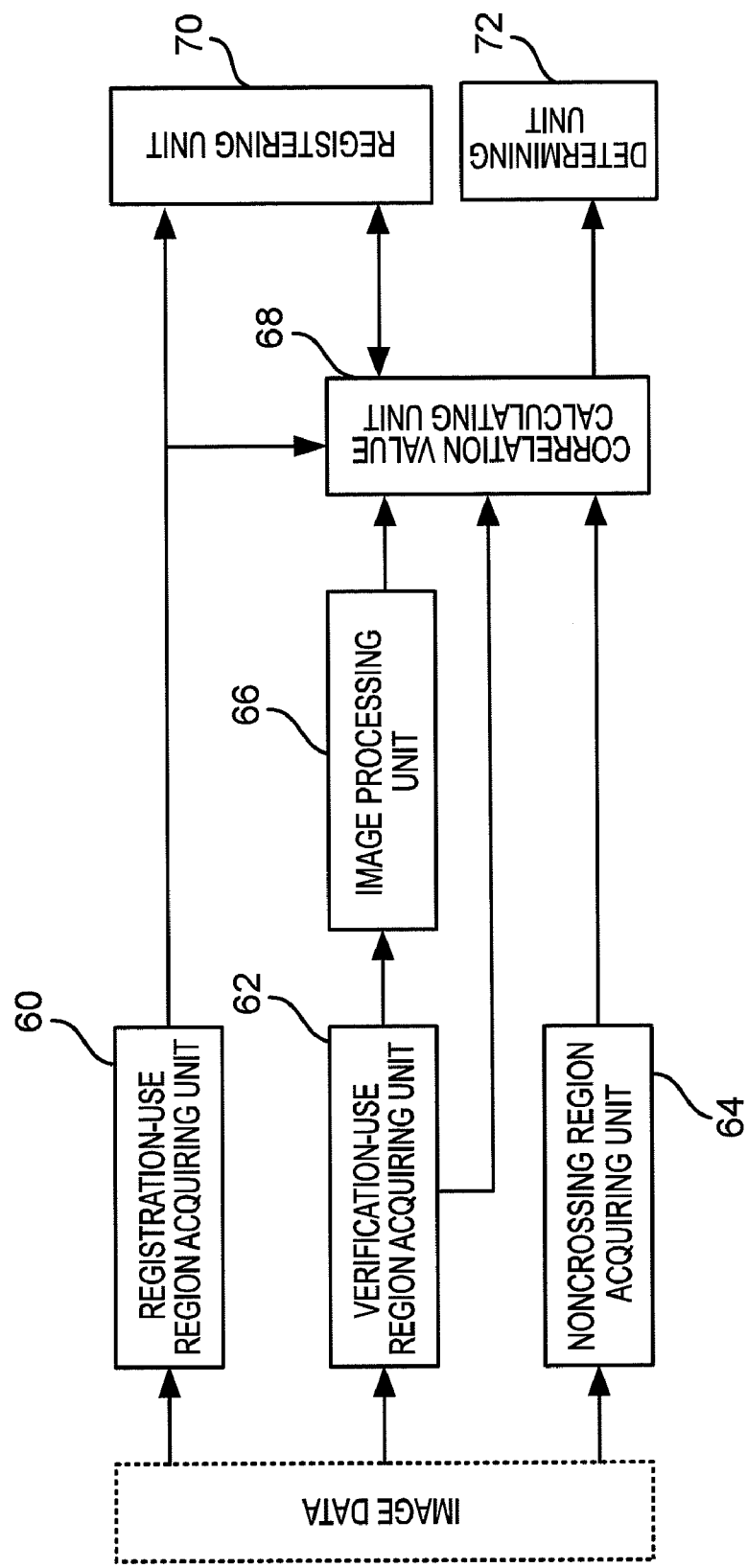
FIG. 5 is a diagram showing a software block of the PC.

On the basis of the above, a software block in the PC 32 will be described using FIG. 5. The software in the registering apparatus is, as shown in FIG. 5, configured to include a registration-use region acquiring unit 60, a verification-use region acquiring unit 62, a noncrossing region acquiring unit 64, an image processing unit 66, a correlation value calculating unit 68, a registering unit 70 and a determining unit 72.

The registration-use region acquiring unit 60 acquires the registration-use image data from the predetermined registration-use regions 52 on the sheet. The verification-use region acquiring unit 62 acquires the verification-use image data from the verification-use regions 50. The image processing unit 66 acquires processed verification-use image data by administering image processing that adds distortion with respect to the verification-use image data from the verification-use region acquiring unit 62. This image processing that adds distortion will be discussed later.

The noncrossing region acquiring unit 64 acquires noncrossing region image data that have been obtained by reading noncrossing regions (third regions) that do not include the registration-use regions 52 and differ from the verification-use regions 50 when a correlation value between the verification-use image data or the processed verification-use image data and the registration-use image data is equal to or greater than a predetermined first threshold value. It is good if the noncrossing regions are also regions on the sheet that do not cross the verification-use regions 50.

The correlation value calculating unit 68 calculates a correlation value between the verification-use image data or the processed verification-use image data and the registration-use image data. Further, the correlation value calculating unit 68 calculates a correlation value between the noncrossing region image data and the registration-use image data. The details of the correlation values will be discussed later.

The registering unit 70 registers the registration-use image data as image data (the identification-use image data) to be used in authentication of the sheet when the correlation value between the noncrossing region image data and the registration-use image data is equal to or less than a second threshold value.

The determining unit 72 determines that the sheet from which the verification-use image data have been acquired is an authentic sheet when the correlation value between the verification-use image data that have been acquired by the verification-use region acquiring unit 62 and the identification-use image data that have been registered by the registering unit 70 is equal to or greater than the first threshold value.

Here, the method by which the correlation value calculating unit 68 calculates correlation values will be described. In the present exemplary embodiment, the correlation value calculating unit 68 calculates, as a correlation value, a correlation maximum value and a normalized score. First, the correlation maximum value will be described. A common numerical expression for calculating the correlation maximum value is expression (1) below.

$$F = \{f_i\}_{i=0}^{N-1}, \quad G = \{g_i\}_{i=0}^{N-1} \quad (1)$$

$$\text{Correlation Value} = \frac{\sum_{n=0}^{N-1}(f_n - f_{AVE})(g_n - g_{AVE})}{\sqrt{\sum_{n=0}^{N-1}(f_n - f_{AVE})^2}\sqrt{\sum_{n=0}^{N-1}(g_n - g_{AVE})^2}}$$

Here, F is a set of fi of one group of image data of two groups of image data whose correlation value is to be calculated, fi are illuminance values of individual pixels, N is a total number of pixels, G is a set of gi of the other group of image data, and gi are illuminance values of individual pixels of a partial region of a verification image. In this example, the numbers of pixels are equal, but they may also be different.

Further, $f_{AVE}$ is an average value of fi, and $g_{AVE}$ is an average value of gi. Assuming that m×n represents the number of dots of the one group of image data and that M×N represents the number of dots of the other group of image data, (M−m+1)× (N−n+1) number of correlation values are obtained. The correlation value calculating unit 68 calculates the largest value of these as the correlation maximum value.

Next, the correlation value calculating unit 68 calculates the normalized score in accordance with expression (2) below.

Normalized Score=(Maximum Value of Correlation Values−Average Value of Correlation Values)/ (Standard Deviation of Correlation Values) (2)

Figure 6A:
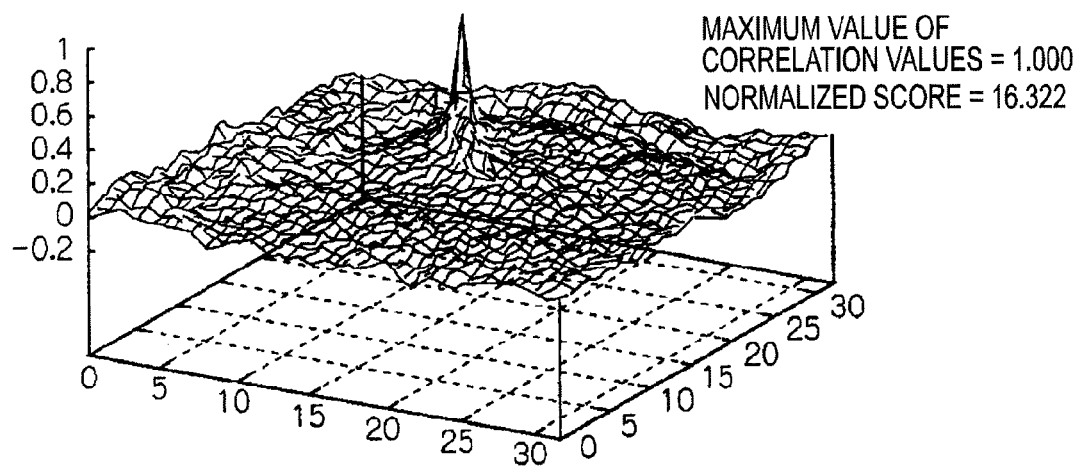
FIG. 6A is a line diagram showing a distribution of correlation values that have been computed using the same image of the same paper together with a maximum value of the correlation values and a normalized score.
Figure 6B:
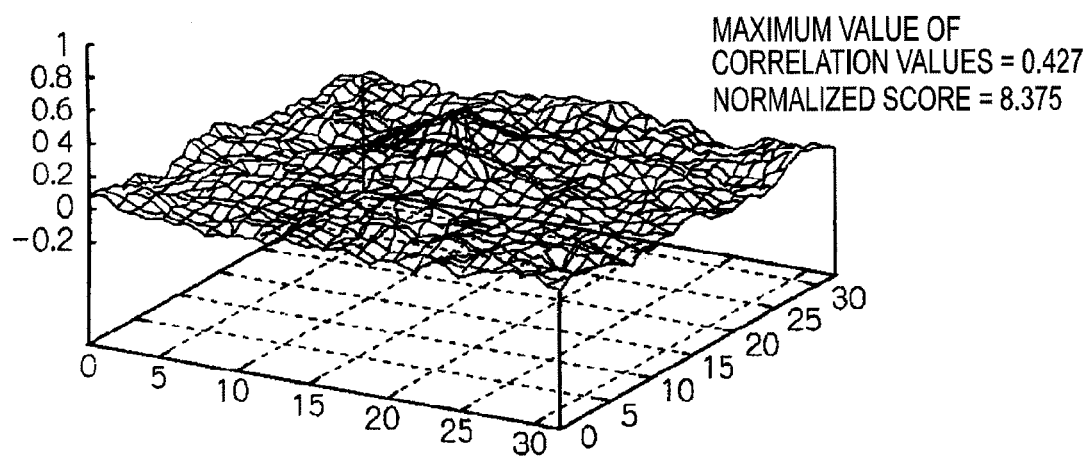
FIG. 6B is a line diagram showing a distribution of correlation values that have been computed after rotating an image to shift its position on the same paper together with a maximum value of the correlation values and a normalized score.
Figure 6C:
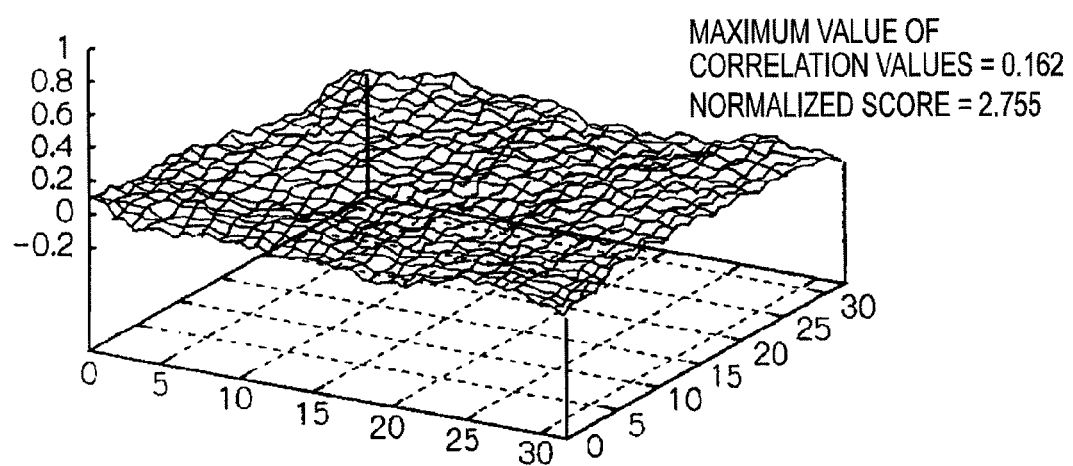
FIG. 6C is a line diagram showing a distribution of correlation values that have been computed on different paper together with a maximum value of the correlation values and a normalized score.

In FIG. 6A, FIG. 6B and FIG. 6C, there are shown charts that visually show the relationship between image position and correlation values as examples of the result of computing the maximum value of the correlation values and the normalized score of the maximum value of the correlation values.

As shown in FIG. 6A, when a region on the same sheet is read without any shift in position and direction, the maximum value of the correlation values is an extremely large value. Further, the distribution of the correlation values is also such that the correlation values are extremely low values in comparison to the maximum value in the portion outside the peak portion where the correlation values reach a maximum. In accompaniment with this, the normalized score of the maximum value of the correlation values is also an extremely large value.

On the other hand, when a region on the same sheet is read with a slight change in position and direction, the maximum value of the correlation values and the normalized score of the maximum value of the correlation values both become, as shown in FIG. 6B, intermediate values between when the same sheet is read without any shift in position and direction and when a different sheet is read.

Further, when a different sheet is read, as shown in FIG. 6C, the maximum value of the correlation values becomes an extremely low value, and the distribution of the correlation values is also such that the correlation values are low values overall including the peak portion, so the normalized score of the maximum value of the correlation values also becomes an extremely low value.

The correlation value in the present exemplary embodiment uses the maximum value of the correlation values and the normalized score described above that become larger values the more they are similar. However, the correlation value is not limited to these and may also use other correlation values that exhibit similarity. It will be noted that it has been mentioned that there is the potential for black lines to occur when a sheet is read with the scanner 80 shown in FIG. 3. However, when black lines occur, the correlation value does not become equal to or greater than a certain threshold value, so registration-use image data where black lines have occurred are not registered in registration processing discussed later.

Next, the structure of the registration DB discussed above will be described using FIG. 7. The registration DB has, as shown in FIG. 7, a structure that includes sheet IDs and k-number of identification-use image data names. Of these, the sheet IDs are numbers that have been allocated to each sheet in order to identify the sheets. In the case of FIG. 7, the sheet IDs are expressed in hexadecimal numbers.

Further, the identification-use image data names are file names representing the identification-use image data or values indicating that the data could not be registered (in FIG. 7, called "unsuitable"). Further, in FIG. 7, numbers are disposed on the ends of the identification-use data names, as in "identification image data name 1". However, these are numbers for identifying the plural reference regions. For example, in the sheet of FIG. 4, the reference region on the left end is the first, and numbers are allocated in ascending order so that the reference region on the right end is the fifth.

In the registration processing discussed later, the plural reference regions discussed above are read with respect to one sheet. Of the plural registration-use image data that have been obtained by reading these plural reference regions, only identification-use image data suited for more accurately identifying the sheet are registered. Consequently, for example, in the sheet whose sheet ID is "000001", the image data that have been obtained by reading the second registration-use region are unsuitable as an image to be accurately identified.

It will be noted that the file names shown in FIG. 7 are "k-sheet ID.dat (k represents a registration region)". Further, as for "unsuitable" shown in FIG. 7, NULL or the like may also be used as an actual value.

Next, FIG. 8 shows an image example represented by image data that have been acquired from a sheet. The image example shown in FIG. 8 is obtained by reading a sheet in a state where the sheet has separated (is raised) from the reading surface of the scanner 34.

The image shown in FIG. 8 represents the fiber of the sheet. It is impossible to control the entanglement of the fiber material that forms sheets at the time of manufacture. Consequently, the entanglement of the fiber material that forms sheets can be regarded as random. That is, image data that differ per sheet can be obtained, and sheets are identified using the image data.

However, an image represented by image data that have been obtained by reading a sheet in a state where the sheet is raised, like the image shown in FIG. 8, for example, becomes a slightly unsharp image. For this reason, there is a potential to mistakenly determine a different sheet as the authentic sheet.

Figure 9B:
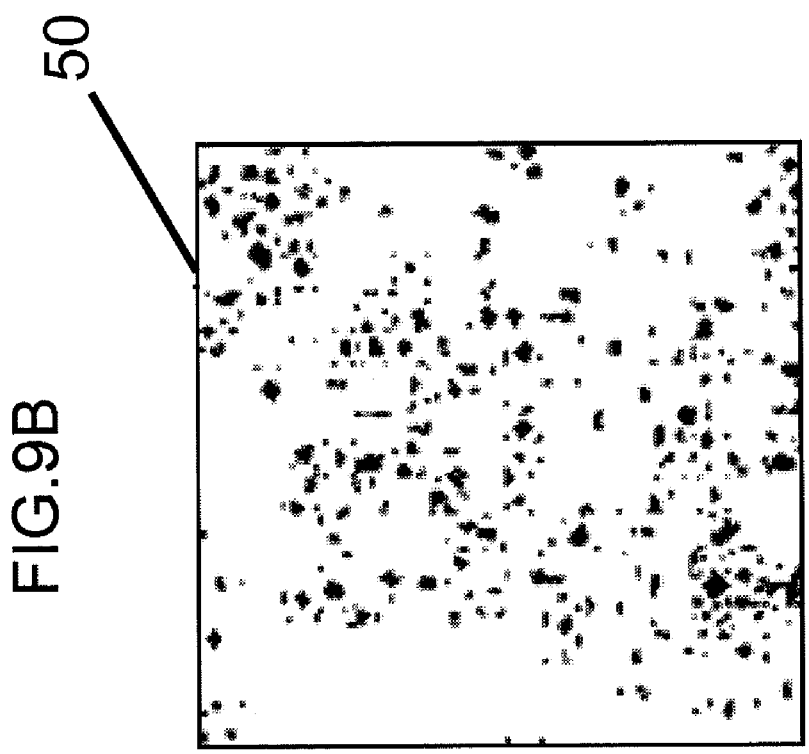
FIG. 9B is an image example represented by verification-use image data that have been obtained from a sheet that is different from the sheet from which the image data representing the image shown in FIG. 9A have been obtained.
Figure 9A:
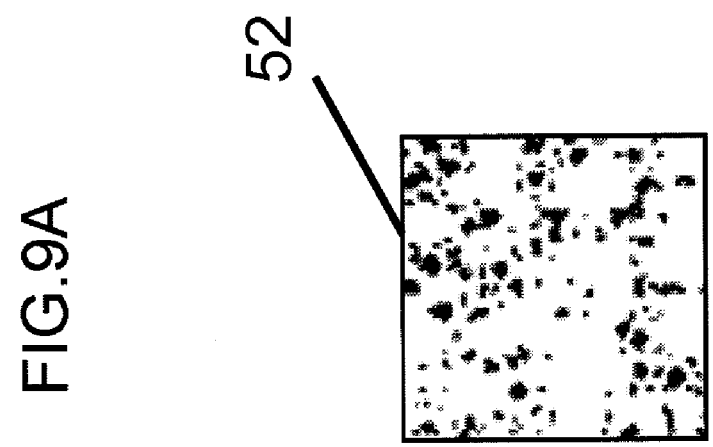
FIG. 9A is a diagram of an image example represented by registration-use image data.

For example, the image shown in FIG. 9A is an image example represented by registration-use image data, and the image shown in FIG. 9B is an image example represented by verification-use image data that have been obtained from a sheet that is different from the sheet from which the image data representing the image shown in FIG. 9A have been obtained.

As for the above-described correlation value in these two groups of image data, the correlation maximum value is 0.37 and the normalized score is 13.0, which are large values where it is alright for the sheets to be identified as authentic sheets.

Thus, in the present exemplary embodiment, the correlation value between the registration-use image data and the processed image data is calculated, and when a large correlation value (whose similarity is large) is obtained here, the registration-use image data are used as a candidate of the identification-use image data.

However, when the correlation value of registration-use image data with noncrossing region image data whose correlation value is ordinarily supposed to be small is large, the registration-use image data become unsuitable as identification-use image data. Consequently, registration-use image data whose correlation value with noncrossing region image data is small are registered as identification-use image data. Thus, image data for more accurately identifying a sheet are registered.

It will be noted that, in the example discussed above, the correlation value between the verification-use image data and the registration-use image data is used. However, a correlation value between verification-use image data to which distortion has been added and registration-use image data may also be used. In this case, when the correlation value between the verification-use image data to which the distortion has been added and the registration-use image data is equal to or greater than a predetermined first threshold, third image data are acquired from third regions that do not include the registration-use regions 52 on the sheet and differ from the verification-use regions 50.

Here, the image processing discussed above that adds distortion with respect to the verification-use image data will be described. The image processing that adds distortion in the present exemplary embodiment is processing that rotates the verification-use image data or processing that superimposes noise on the verification-use image data.

Figure 10B:
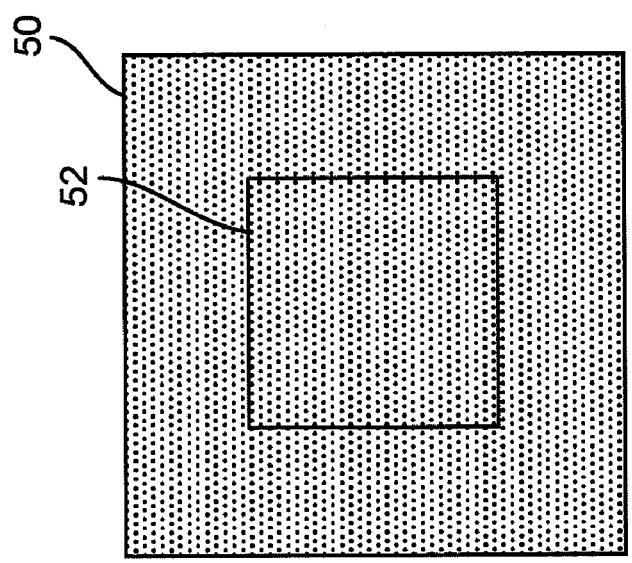
FIG. 10B is a diagram showing an example of processing that superimposes noise on the verification-use image data.
Figure 10A:
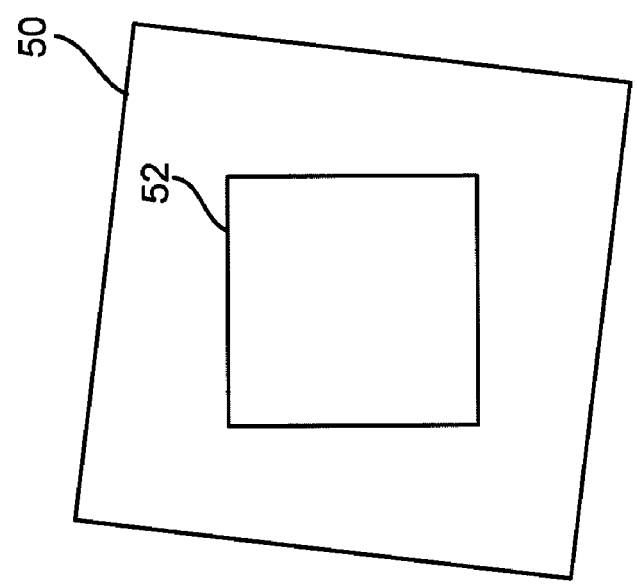
FIG. 10A is a diagram showing an example of processing that rotates the verification-use image data.

This will be described specifically using FIG. 10A and FIG. 10B. FIG. 10A shows an example of the processing that rotates the verification-use image data, and FIG. 10B shows an example of the processing that superimposes noise on the verification-use image data. As shown in FIG. 10A, the rotation processing is processing that rotates the image represented by the verification-use image data several degrees (about 3 degrees). Further, as shown in FIG. 10B, the noise superimposition processing is processing that superimposes noise (in FIG. 10B, numerous black dots) on the image represented by the verification-use image data.

The image processing here aims to obtain image data that appear similar to but are different from the verification-use image data. Consequently, examples of the image processing with respect to the verification-use data include plural types of image processing (brightness correction, contrast correction, γ correction, filtering (mosaic, Laplacian, mean, Gaussian, sharp, Prewitt, Sobel, emboss, median, Robert)). In the description below, an exemplary embodiment using the processed verification-use image data will be described.

Next, a flow of the registration processing will be described using the flowchart of FIG. 11. This flowchart shows processing that acquires k-number of the registration-use image data and the verification-use image data. That is, the processing acquires plural registration-use image data that have been obtained by reading plural registration-use image regions that are mutually different. Further, this processing is executed by the CPU 10.

First, in step 101, the CPU 10 acquires image data that have been obtained by reading a sheet with the scanner 34. The image data here are image data representing the entire sheet. In the next step 102, the CPU 10 acquires k-number of registration-use image data Rn (n=1 to k). In step 103, the CPU 10 acquires k-number of reference-use image data Vn (n=1 to k). In both cases, the registration-use image data and the verification-use image data are obtained by reading the verification-use regions 50 and the registration-use regions 52 because the CPU 10 acquires image data of the corresponding regions from the image data representing the entire sheet including the verification-use regions 50 and the registration-use regions 52.

In the next step 104, the CPU 10 acquires k-number of processed image data Wn (n=1 to k) obtained by administering image processing with respect to the k-number of verification-use image data Vn.

In the next step 105, the CPU 10 initializes a loop counter n by 1. In step 106, the CPU 10 calculates the correlation value between the registration-use image data Rn and the processed image data Wn. Then, in step 107, the CPU 10 determines whether or not the correlation value is equal to or greater than the first threshold. In the case of the correlation maximum value discussed above, 0.3 to 0.6 may be cited as an example of the first threshold, and in the case of the normalized score, 6 may be cited as an example of the first threshold. However, this first threshold is not limited to this as it is a guide value that is used in authentication of sheets that have been registered.

When the determination is NO in step 107, that is, when it is determined that the correlation value is small, the image data are unsuitable for registration. Thus, the CPU 10 proceeds to the processing of step 111 without registering the image data. On the other hand, when the determination is YES in step 107, the CPU 10 calculates the correlation value between the registration-use image data Rn and the noncrossing region image data in step 108. That is, the CPU 10 calculates the correlation value with the noncrossing region image data whose correlation value is supposed to become small.

In step 109, the CPU 10 determines whether or not the correlation value is equal to or greater than the second threshold value. When the determination is YES in step 109, that is, when the CPU 10 determines that the correlation value is large, the image data are unsuitable for registration, so the CPU 10 proceeds to step 111 without registering the image data.

On the other hand, when the determination is NO in step 109, the CPU 10 registers the registration-use image data Rn in the registration DB as identification-use image data in step 110. At this time, the sheet IDs (see registration DB) may be automatically allocated in order, or the sheet IDs may be inputted by the operator and those inputted values may be used, or the sheet IDs may be printed in the form of barcodes or the like on the sheets themselves and the sheet IDs represented by those barcodes may be used.

In step 111, the CPU 10 increases the loop counter n by 1. Then, in step 112, the CPU 10 determines whether or not n=k. When the determination is NO, the CPU 10 returns to the processing of step 106. When the determination is YES, the CPU 10 ends the processing.

Figure 12:
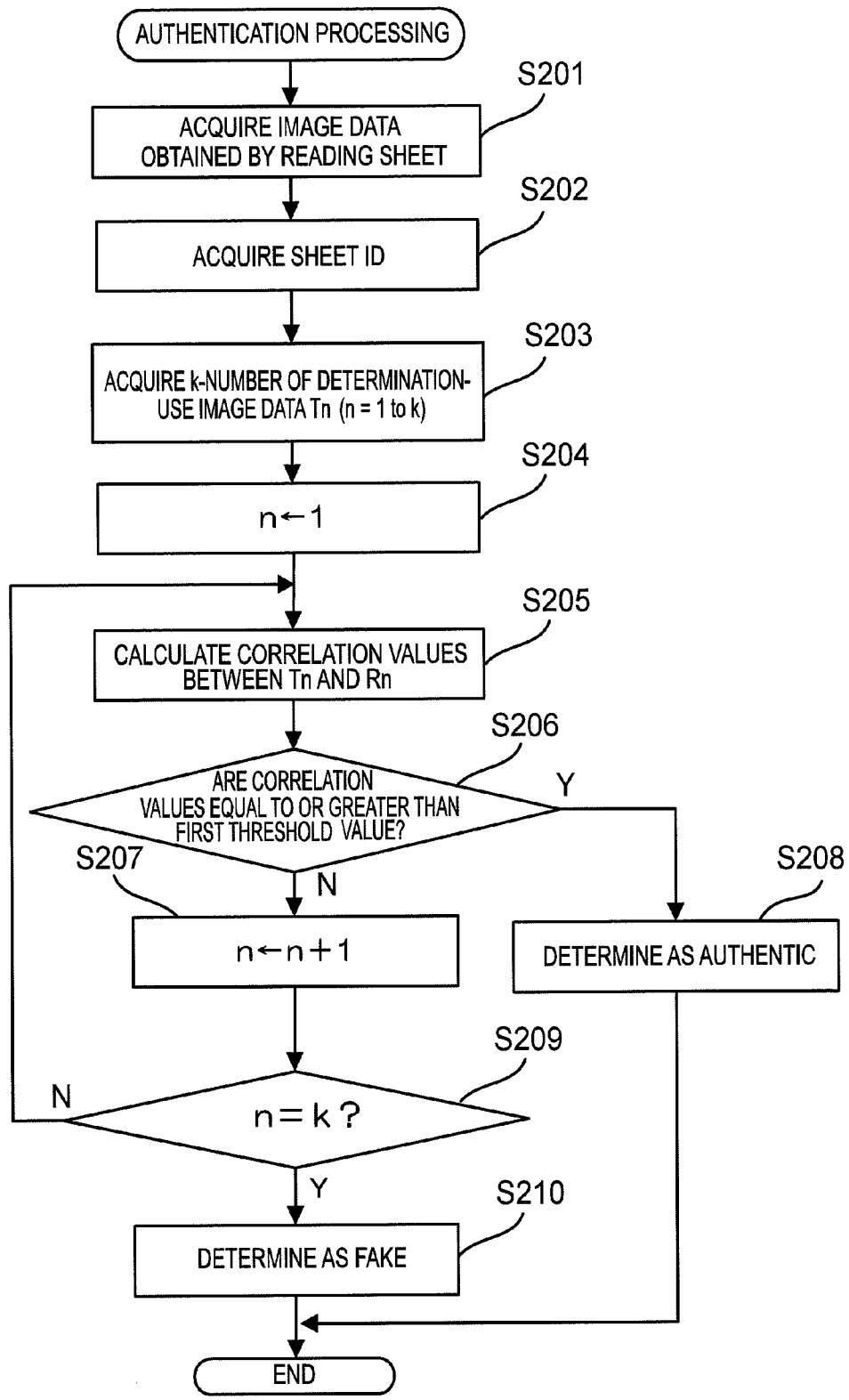
FIG. 12 is a flowchart showing a flow of authentication processing.

Next, authentication processing that determines whether or not a sheet has already been registered in the registration DB, that is, whether or not a sheet is an authentic sheet, will be described using the flowchart of FIG. 12. This processing is also executed by the CPU 10.

First, in step 201, the CPU 10 acquires image data from a sheet with the scanner 34. The image data here are image data representing the entire sheet. In the next step 202, the CPU 10 acquires the sheet ID. The CPU 10 may acquire the sheet ID from the barcode discussed above or may prompt the operator to input the sheet ID.

In step 203, the CPU 10 acquires k-number of determination-use image data Tn (n=1 to k). Determination-use images represent images that have been read from the verification-use regions 50. Thus, determination-use images are acquired by the verification-use region acquiring unit 62.

In the next step 204, the CPU 10 initializes the loop counter n by 1. Then, in step 205, the CPU 10 calculates the correlation value between the determination-use image data Tn and Rn (here, Rn as identification-use image data) with which the sheet ID that has been registered by the registering unit 70 matches. In step 206, the CPU 10 determines whether or not the correlation value is equal to or greater than the first threshold. When the determination is YES, the CPU 10 determines that the sheet is authentic in step 208.

Consequently, in a case where plural groups of identification-use image data are registered with respect to one sheet, when the correlation value between at least one group of the identification-use image data of the plural groups of identification-use image data and the determination-use image data is equal to or greater than the first threshold value, the CPU 10 determines that the sheet from which the determination-use data have been acquired is an authentic sheet. Thus, when a sheet read with the scanner 80 shown in FIG. 3 for which there is the potential for black lines to occur, the sheet is determined to be an authentic sheet provided that there is at least one determination-use image data on which a black line does not occur.

On the other hand, when the determination is NO in step 206, the CPU 10 increases the loop counter n by 1 in step 207. Then, in step 209, the CPU 10 determines whether or not n=k. When the determination is NO, the CPU 10 returns to the processing of step 205. When the determination is YES, the CPU 10 determines that the sheet is authentic in step 210 and ends the processing. Because of the above processing, the sheet is more accurately identified.

It will be noted that, in the determination processing, the sheet ID is not invariably necessary. When a sheet ID does not exist, it suffices for the CPU 10 to calculates the correlation value between the determination-use image data Tn and all of the identification-use image data Rn that have been registered, determine that the sheet is authentic when there are Rn where the correlation value becomes equal to or greater than the first threshold, and determine that the sheet is fake when such is not the case.

Figure 13:
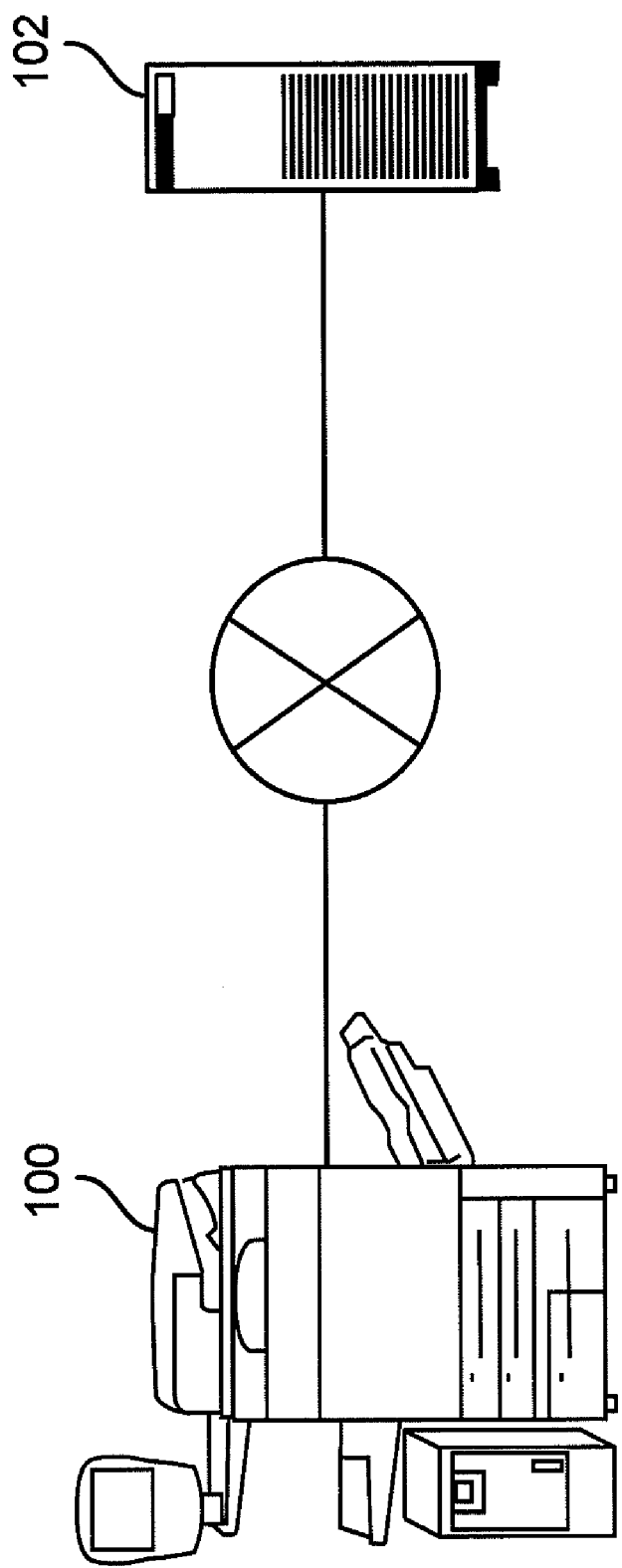
FIG. 13 is a diagram showing a registering system.

In the exemplary embodiment described above, an exemplary embodiment configured by the PC 32 and the scanner 34 has been described. However, as shown in FIG. 13, the exemplary embodiment can also be applied to a network-mediated system. In FIG. 13, there is shown a registering system where an image processing apparatus 100 having a scanner function and a server 102 are interconnected via a network. It will be noted that the image processing apparatus 100 has a display panel that displays information to the operator.

In this registering system, the image processing apparatus 100 and the server 102 perform the operation below.

First, the image processing apparatus 100 acquires registration-use image data from the predetermined registration-use regions 52 on a sheet and acquires verification-use image data from the verification-use regions 50 that include the registration-use regions 52. Moreover, when the correlation value between the verification-use image data and the registration-use image data is equal to or greater than the predetermined first threshold, the image processing apparatus 100 acquires the noncrossing region image data from the noncrossing regions that do not include the registration-use regions 52 on the sheet and differ from the verification-use regions 50.

Then, when the correlation value between the noncrossing region image data and the verification-use image data is equal to or less than the second threshold value, the image processing apparatus 100 registers the registration-use image data in the server 102 by transmitting the registration-use image data to the server 102 as image data (identification-use image data) to be used in authentication. Thus, registration processing of the sheet ends.

In the authentication processing, the server 102 determines that the sheet from which the registration-use image data have been acquired is an authentic recording medium when the correlation value between the verification-use image data that have been acquired by the image processing apparatus 100 and the identification-use image data that have been registered is equal to or greater than the first threshold value. The server 102 transmits that determination result to the image processing apparatus 100, whereby the image processing apparatus 100 displays the determination result on the display panel.

It will be noted that each of the values (the first threshold value, the second threshold value) used in the determination processing in each of the flowcharts described above is not limited to that value and may be set by the operator or appropriately determined as a specification. Further, the flow of processing of each of the flowcharts is only one example, and the processing order may be changed, new steps may be added, and unnecessary steps may be deleted within a scope that does not depart from the gist of the present invention.

What is claimed is:

1. A registering apparatus comprising:
    a first image data acquiring unit that acquires first image data from a predetermined first region on a recording medium;
    a second image data acquiring unit that acquires second image data from a second region that includes the first region;
    a third image data acquiring unit that acquires third image data from a third region that does not include the first region on the recording medium and differs from the second region when a correlation value between the second image data and the first image data is equal to or greater than a predetermined first threshold value; and
    a registering unit that determines whether a correlation value between the third image data and the first image data is less than a second threshold value and, if the correlation value is less than the second threshold value, registers the first image data as registration data that are image data to be used in authentication of the recording medium, and if the correlation value is equal to or greater than the second threshold value, does not register the first image data as the registration data.

2. The registering apparatus according to claim 1, further comprising a unit that administers image processing that applies a rotation or adds noise to the second image data, wherein the third image data acquiring unit acquires third image data from a third region that does not include the first region on the recording medium and differs from the second region when a correlation value between the second image data to which the distortion has been added and the first image data is equal to or greater than a predetermined first threshold value.

3. The registering apparatus according to claim 1, wherein the first image data acquiring unit, the second image data acquiring unit and the third image data acquiring unit respectively acquire the first image data, the second image data and the third image data from image data that have been obtained by conveying the recording medium and reading the recording medium as it is being conveyed.

4. The registering apparatus according to claim 1, wherein the first image data acquiring unit acquires a plurality of first image data from each of a plurality of first regions that are mutually different and, when reading the recording medium as it is being conveyed, also acquires a plurality of first image data from each of a plurality of first regions positioned in a direction perpendicular to the conveyance direction.

5. An authentication system comprising:
    a first image data acquiring unit that acquires first image data from a predetermined first region on a recording medium;
    a second image data acquiring unit that acquires second image data from a second region that includes the first region;
    a third image data acquiring unit that acquires third image data from a third region that does not include the first region on the recording medium and differs from the second region when a correlation value between the second image data and the first image data is equal to or greater than a predetermined first threshold value;
    a registering unit that determines whether a correlation value between the third image data and the first image data is less than a second threshold value and, if the correlation value is less than the second threshold value, registers the first image data as registration data that are image data to be used in authentication of the recording medium, and if the correlation value is equal to or greater than the second threshold value, does not register the first image data as the registration data;
    an authentication unit that determines that the recording medium from which the second image data have been acquired is an authentic recording medium when the correlation value between the second image data that have been acquired by the second image data acquiring unit and the image data to be used in the authentication that have been registered by the registering unit is equal to or greater than the first threshold value; and
    a display unit that displays the result of determination by the authentication unit.

6. The authentication system according to claim 5, wherein the authentication unit determines, when a plurality of the image data to be used in the authentication is registered with respect to one recording medium, that the recording medium from which the second image data have been acquired is an authentic recording medium when the correlation value between at least one of the image data to be used in the authentication of the plurality of the image data to be used in the authentication and the second image data is equal to or greater than the first threshold value.

7. A non-transitory computer-readable storage medium storing a registering program, the registering program causing a computer to:
    acquire first image data from a predetermined first region on a recording medium;
    acquire second image data from a second region that includes the first region;

acquire third image data from a third region that does not include the first region on the recording medium and differs from the second region when a correlation value between the second image data and the first image data is equal to or greater than a predetermined first threshold value; and determine whether a correlation value between the third image data and the first image data is less than a second threshold value and, if the correlation value is less than the second threshold value, register the first image data as image data to be used in authentication of the recording medium, and if the correlation value is equal to or greater than the second threshold value, not register the first image data as the registration data.

8. The computer-readable storage medium according to claim 7, wherein the registering program further causes the computer to administer image processing that adds distortion with respect to the second image data and acquire third image data from a third region that does not include the first region on the recording medium and differs from the second region when a correlation value between the second image data to which the distortion has been added and the first image data is equal to or greater than a predetermined first threshold value.

9. The computer-readable storage medium according to claim 7, wherein the registering program further causes the computer to acquire a plurality of first image data from each of a plurality of first regions that are mutually different and, when reading the recording medium as it is being conveyed, also to acquire a plurality of first image data from each of a plurality of first regions positioned in a direction perpendicular to the conveyance direction.

10. A registering method comprising:

acquiring first image data from a predetermined first region on a recording medium;

acquiring second image data from a second region that includes the first region;

acquiring third image data from a third region that does not include the first region on the recording medium and differs from the second region when a correlation value between the second image data and the first image data is equal to or greater than a predetermined first threshold value; and determining whether a correlation value between the third image data and the first image data is less than a second threshold value and, if the correlation value is less than the second threshold value, registering the first image data as image data to be used in authentication of the recording medium, and if the correlation value is equal to or greater than the second threshold value, not registering the first image data as the registration data.

11. The registering method according to claim 10, further comprising administering image processing that adds distortion with respect to the second image data and acquiring third image data from a third region that does not include the first region on the recording medium and differs from the second region when a correlation value between the second image data to which the distortion has been added and the first image data is equal to or greater than a predetermined first threshold value.

12. The registering method according to claim 10, further comprising acquiring a plurality of first image data from each of a plurality of first regions that are mutually different and, when reading the recording medium as it is being conveyed, also acquiring a plurality of first image data from each of a plurality of first regions positioned in a direction perpendicular to the conveyance direction.

13. The registering apparatus according to claim 1, further comprising a unit that administers image processing that applies a rotation with respect to the second image data but does not add a rotation to the first image data or to the third image data, wherein the third image data acquiring unit acquires third image data from a third region that does not include the first region on the recording medium and differs from the second region when a correlation, value between the second image data to which the distortion has been added and the first image data is equal to or greater than a predetermined first threshold value.

* * * * *